United States Patent
LaVigne et al.

(10) Patent No.: US 6,289,066 B1
(45) Date of Patent: Sep. 11, 2001

(54) METHOD AND APPARATUS FOR RECENTERING AN ELASTICITY FIFO WHEN RECEIVING 1000BASE-X TRAFFIC USING MINIMAL INFORMATION

(75) Inventors: Bruce E. LaVigne, Roseville; Patricia A. Thaler, Carmichael; Paul O'Connor, Grass Valley, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/096,143

(22) Filed: Jun. 11, 1998

(51) Int. Cl.$^7$ .......................................... H04L 7/00
(52) U.S. Cl. ................................................. 375/372
(58) Field of Search ................................. 375/372, 354, 375/371, 377; 370/516, 517, 518, 505, 503; 713/400

(56) References Cited

U.S. PATENT DOCUMENTS

| | | | |
|---|---|---|---|
| 4,181,975 | * 1/1980 | Jenkins | 364/900 |
| 4,785,415 | * 11/1988 | Karlquist | 364/900 |
| 4,873,703 | 10/1989 | Crandall et al. | 375/118 |
| 5,119,406 | * 6/1992 | Kramer | 375/118 |
| 5,359,605 | * 10/1994 | Urbansky et al. | 370/102 |
| 6,055,248 | * 4/2000 | Kobayashi | 370/517 |

OTHER PUBLICATIONS

"Fibre Channel—10–bit Interface", X3 Technical Committee of American National Standards Institute, Information Technology Industry Council, Revision 2.3.

* cited by examiner

Primary Examiner—Stephen Chin
Assistant Examiner—Mohammad Ghayour

(57) ABSTRACT

A method and apparatus is provided that solves the problem of data overrun and underrun, for example in a system that exchanges data using the Gigabit Ethernet protocol. A single 8-bit data path is provided as output and the main protocol state machines are kept running in the clock domain of the rest of the circuit, after an elasticity FIFO, so that no additional synchronization is necessary. The invention makes no demands upon the receive clock other than those specified in the relevant standard for duty cycle and accuracy. The invention correctly combines the two effective data streams back into a single data stream, only modifying the FIFO when it is acceptable to do so, and in a way that does not corrupt data packets passing through the FIFO. By providing a minimal set of logic running in the receive clock domain, it is possible to simplify the design of the main protocol state machines. Only a very small portion of the design must be aware of the dual-clock nature of the physical interface. In addition, because all key state machines are no longer in the receive clock domain, any state information or registers are available even if the receive clocks are not running correctly, as is the case with a removable transceiver design.

14 Claims, 3 Drawing Sheets

METHOD AND APPARATUS FOR RECENTERING AN ELASTICITY FIFO WHEN RECEIVING 1000BASE-X TRAFFIC USING MINIMAL INFORMATION

BACKGROUND OF THE INVENTION

1. Technical Field

The invention relates to computer networks. More particularly, the invention relates to a synchronizing system, and further relates to means used between two devices transmitting data at different speeds to counteract this speed differential as a buffer in systems that are used for the exchange of information over a computer network, especially with regard to the Gigabit Ethernet protocol (IEEE 802.3, clause 36, 1000BASE-X).

2. Description of the Prior Art

In any circuit interfacing two non-correlated and asynchronous clocks, there exists a non-zero probability of sampling a signal from one system with the clock from the other system while the signal is changing. The result of such a sampling, where set-up and hold times are not met, may be an erroneous output. Unpredictably the output can be logic "1", logic "0", or in a metastable state between "1" and "0." This undefined logic state may be interpreted differently by different receiving devices, and in a general configuration it is able to propagate through the succeeding logic gates.

This metastable state is discussed in L. Marino, *General Theory of Metastable Operation*, IEEE TRANSACTIONS ON COMPUTERS, Vol. C.30, No. 2, pp. 107–115 (February 1981); T. Chaney et al, *Anomalous Behavior of Synchronizer and Arbiter Circuits*, IEEE TRANSACTIONS ON COMPUTERS, Correspondence, pp. 421–422 (April 1973); and D. Kinniment et al, Circuit *Technology in a large computer system*, THE RADIO AND ELECTRONIC ENGINEER, Vol. 43, No. 7, pp. 435–441 (July 1973).

The metastable state is potentially unstable and the probability that the output stays in a metastable state decays exponentially with time. All logic families exhibit the metastable operation, when sampling occurs on a transition. However, families with a high-gain bandwidth product are less inclined to exhibit the metastable state than those with a low-gain bandwidth product. The metastable problem is a fundamental problem in digital circuits interfacing asynchronous clocks, and there exists no exact solution to avoid errors. However, the probability of inducing errors due to the metastable operation can be reduced by allowing longer time for the output to settle from the metastable state and by employing high-gain bandwidth product devices.

A method of allowing this output to settle while still receiving data from the source uses what is referred to as an elasticity FIFO, where data is input into the FIFO structure in the incoming clock, and output several unit times later with the outgoing clock. The FIFO acronym refers to "First In First Out", meaning that each datum is output in the order it was received.

In Fiber Channel and Gigabit Ethernet (IEEE 802.3, clause 36, 1000BASE-X, the serial data stream runs continuously and the transmit and receive clock frequencies may differ by as much as 200 parts per million (ppm). The result is that over time, the FIFO that is used to cross this clock boundary reaches a full or empty position. Accordingly, some action must be taken to prevent data overrun or underrun.

An elasticity FIFO (see V. Cavanna, *Synchronizing System*, U.S. Pat. No. 4,873,703 (Oct. 10, 1989)) was used in a Fiber Channel ASIC (Tachyon), manufactured by Hewlett-Packard Company of Palo Alto, Calif. In the Cavanna design, the solution to adding/deleting entries from the FIFO is to put an elasticity FIFO after the protocol decoder. This allows the FIFO to be aware of when it may safely add or remove symbols. Unfortunately, this approach has the disadvantage that a greater share of the circuit's logic is running off of the incoming clock(s). This is an undesirable result, especially in the Ethernet switching market, where removable transceivers are common—and thus there are times when there is no incoming clock. It is also desirable for testability of the chip to have as much circuitry as possible running off a single clock. Also, keeping the circuitry in the receive clock domain small is better design practice since in cases where circuitry is split between multiple clocks, bugs are often introduced by using a signal from one clock domain in the other clock domain.

For both Fiber Channel and Gigabit Ethernet, the defined interface (see ANSI Technical Report TR/X3.18-1997) uses two receive clocks, each 180 degrees out of phase from one another. This dual clocking allows the interface to use slower logic, but introduces many problems as well. The Cavanna design solves these problems by widening the data path to 16 bits and by clocking most logic off one of the receive clocks. This is acceptable for Fiber Channel devices because all transactions are performed in units of 16 or 32 bits. For Gigabit Ethernet, however, the minimum unit is only 8 bits. While implementations have been developed using wider data paths for Gigabit Ethernet, such wider data path adds size and complexity to the design, especially where it is necessary to signal how many bytes of data are valid within a single data unit and when handling corner cases which arise out of this design style.

Another possible solution to the foregoing problem is to generate a 2× clock from the incoming receive clocks. This design, however, would be fraught with problems. For example, this design would require a phase locked loop (PLL) circuit to lock on to the receive clocks, where the receive clocks are already the output of another PLL.

It would be advantageous to provide a method and apparatus that prevents data overrun or underrun in a system that exchanges data using such data exchange protocols as the Gigabit Ethernet protocol.

SUMMARY OF THE INVENTION

The invention provides a method and apparatus that solves the problem of data overrun and underrun, for example in a system that exchanges data using the Gigabit Ethernet protocol, providing a single 8-bit data path as output and keeping the main protocol state machines running in the clock domain of the rest of the circuit, after an elasticity FIFO, so no additional synchronization is necessary. The invention makes no demands upon the receive clock other than those specified in the relevant standard for duty cycle and accuracy. The mechanism provided by the invention correctly combines the two effective data streams back into a single data stream, only modifying the FIFO when it is acceptable to do so, and in a way that does not corrupt data packets passing through the FIFO.

DETAILED DESCRIPTION OF THE INVENTION

The invention provides a method and apparatus that solves the problem of data overrun and underrun, for example in a system that exchanges data using the Gigabit Ethernet protocol, providing a single 8-bit data path as output and keeping the main protocol state machines running in the clock domain of the rest of the circuit, after an elasticity FIFO, so that no additional synchronization is necessary. The invention makes no demands upon the receive clock other than those specified in the relevant standard for duty cycle and accuracy. The mechanism provided by the invention correctly combines the two effective data streams back into a single data stream, only modifying the FIFO when it is acceptable to do so, and in a way that does not corrupt data packets passing through the FIFO.

By providing a minimal set of logic running in the receive clock domain, it is possible to simplify the design of the main protocol state machines. Only a very small portion of the design must be aware of the dual-clock nature of the physical interface. In addition, because all key state machines are no longer in the receive clock domain, any state information or registers are available even if the receive clocks are not running correctly, as is the case with a removable transceiver design.

Figure 1:
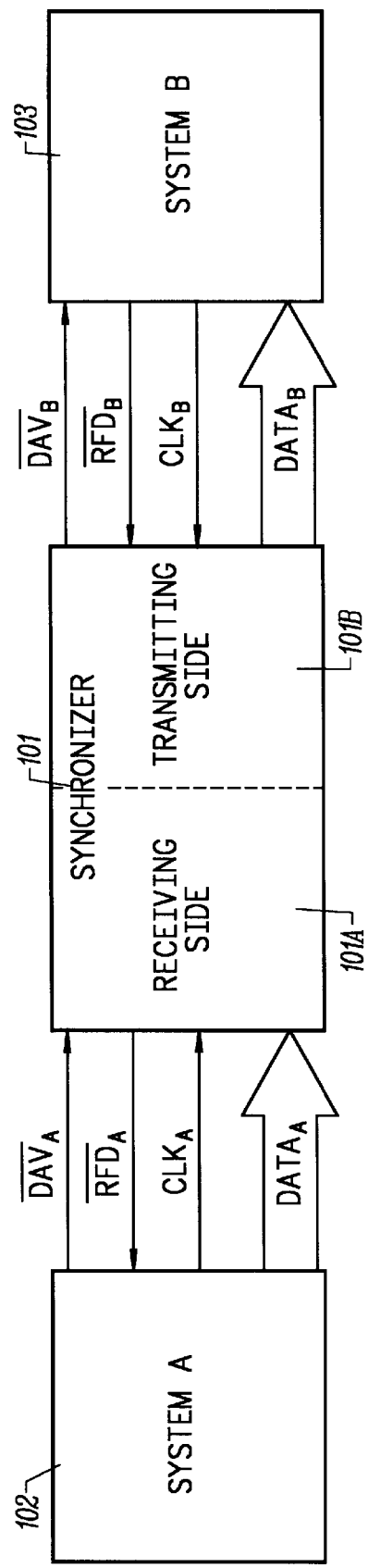
FIG. 1 is a block schematic diagram of a computer network showing a system A, a system B, and a synchronizer.

In FIG. 1, a typical synchronizing system is shown as a system configuration. The synchronizing system consists of a synchronizer 101 having a receiving side 101A coupled to a system A 102 and a transmitting side 101B coupled to a system B 103. The coupling of the synchronizer 101 to the system A 102 and the system B 103 is performed by a synchronous and interlocked handshake operation. It is synchronous because all lines in the interface are synchronous with the transfer clock frequency. It is used on the input and output side of the synchronizer circuit in which case the synchronizer translates one synchronous handshake into a similar handshake synchronous with an arbitrary second clock. Data (DATA) are transferred in bytes of any width at the rate of a clock signal (CLK). Each data byte is labeled with a "data available" signal (DAV). For each clock cycle, the data sink presents a "ready for data" signal (RFD).

The invention provides a mechanism within the synchronizer that enhances the synchronizing FIFO described in V. Cavanna, *Synchronizing System*, U.S. Pat. No. 4,873,703 (Oct. 10, 1989), to merge symbols from two separate input clock domains, 180 degrees out of phase with one another, into the single output clock domain. This invention provides this mechanism with a minimal amount of additional circuitry necessary to add or remove elements from the FIFO correctly, to maintain a valid Gigabit Ethernet data stream in the face of disparate (up to 200 ppm) input and output clock frequencies.

A key aspect of this mechanism is determining when it is acceptable to add or remove symbols from the data stream. This requires some understanding of the protocol used by Gigabit Ethernet (IEEE 802.3 clause 36, 1000BASE-X). Data produced and consumed by the MAC layer are converted from 8-bit bytes into 10-bit symbols, which are then serialized across the physical medium. During packet transmission, each byte is converted into a single 10-bit symbol. However, during the idle periods between packets, a pair of 10-bit symbols are used repeatedly, and during link configuration, a quartet of 10-bit symbols (CONFIG words) are used repeatedly. Thus, during packet reception, no symbols may be added or removed without corrupting the incoming packet. During idle, symbols may be added or removed, but only in pairs. During configuration, symbols may be added or removed, but only in quartets (unless the upper layer is made aware of the operation—as is practiced by the invention, which only adds/removes in pairs).

Figure 2:
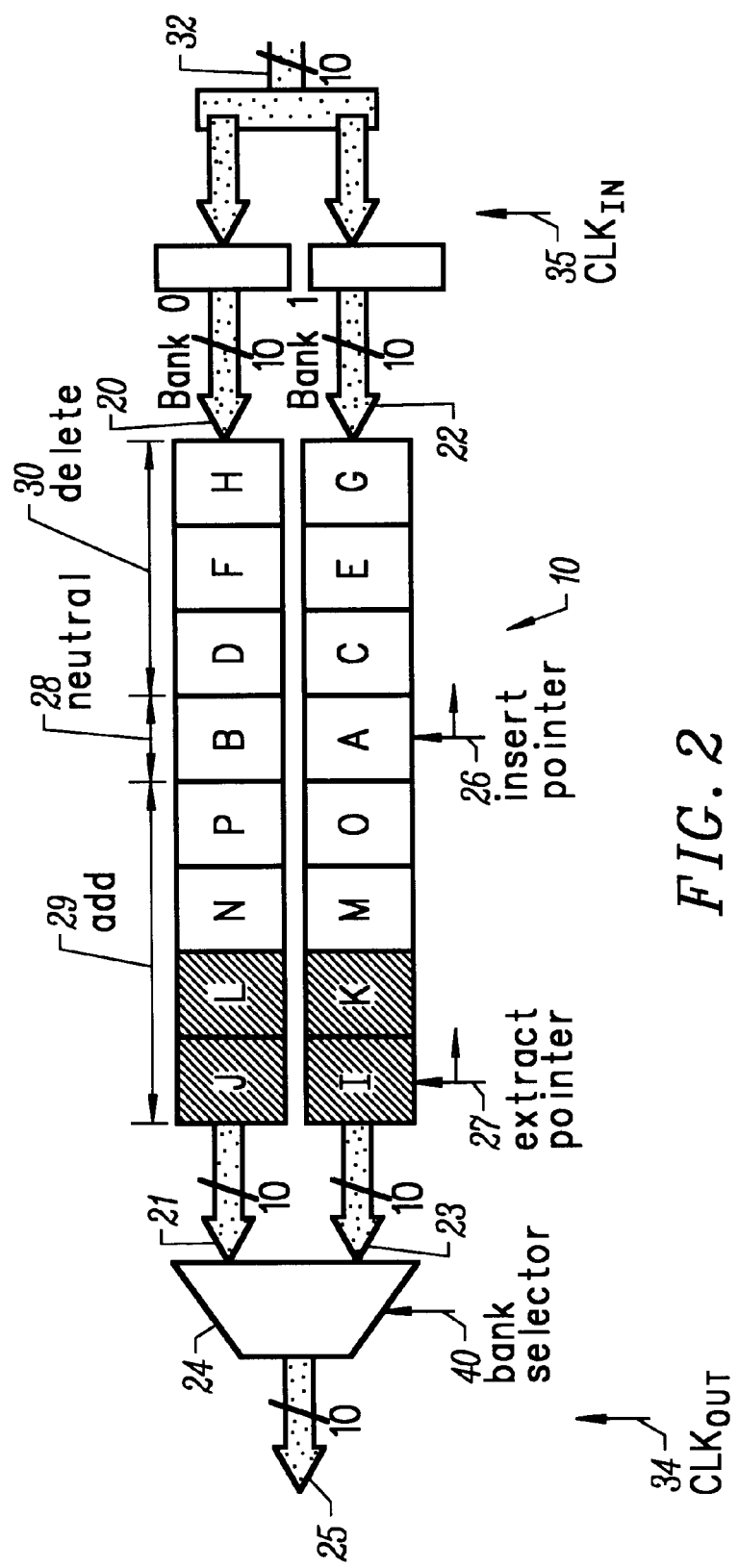
FIG. 2 is a block schematic diagram of a FIFO showing the insert and extract areas according to the invention.

FIG. 2 is a block schematic diagram of a FIFO showing the insert and extract areas according to the invention. The preferred embodiment of the invention uses a single insert pointer 26 into two banks (i.e. bank 0 and bank 1, 20 and 22, respectively) of the FIFO 10. In FIG. 2, the banks are actually the data elements, e.g. bank 0 consists of all the elements JLNPBDFH. Each input clock writes data symbols from a common data stream 32 into a specific, corresponding bank of the FIFO, and the insert pointer moves forward after bank 0 is written. The output clock 34, running at roughly 2× the input clock 35, alternately reads data symbols from the two banks by muxing the output of the two FIFO banks with a multiplexer 24 as controlled by a bank selector 40 which toggles during every output clock cycle.

Another key to the design is monitoring the next four symbols in the FIFO, in the output clock domain. If the FIFO is getting too full or too empty, and the symbols indicate that the system is at a point where it is safe to perform an add/delete operation, then the operation is performed. Because the preferred embodiment of the invention only adds/deletes in pairs, a signal is sent up to the upper level state machine indicating that a shortened CONFIG word may have been created due to the add/delete.

The Gigabit Ethernet protocol always results in idle and configuration sequences starting with the first byte on the bank 0 clock. Therefore, the first byte of the idle signal and the 1st and 3rd bytes of a configuration word is always in bank 0. The second byte of the idle signal and the 2nd and 4th bytes of a configuration word are always in bank 1. The preferred embodiment makes use of this characteristic to simplify detection of configuration and idle as well as insertion and deletion of symbols.

By way of example of the operation of the preferred embodiment of the invention, in FIG. 2 it is assumed that bank 0 has just been written, and that the insert pointer 26 has moved to point to element "A" as the next element about to be written. Also, it is assumed the bank selector 40 just toggled to 1 and the extract pointer 27 has moved to point to element "I" as the next element to be read. The FIFO is half full: entries "I", "J", "K", "L", "M", "N", "O", and "P" are filled. The shaded elements "I", "J", "K", and "L" are being examined to determine if the FIFO can allow modifications. If the symbols in these locations map to IDLE or CONFIG sequences, then it is permissible to modify the FIFO. In this case, because the FIFO is exactly half full, it is in the neutral position 28, such that no additions or deletions are necessary. If the FIFO is under half full, it is said to be in the "add" region 29, if the FIFO is over half full, it is said to be in the "delete" region 30. Note also that if the FIFO content falls to only four symbols, it is effectively empty because it is necessary to examine the next four symbols to determine if the FIFO may be modified.

The single insert pointer 26 always moves forward after bank 0 has been written (except if the FIFO is about to overflow) which, combined with the two input clocks 180 degrees out of phase, alternately writes symbols from each clock domain into the FIFO. Normally, the extract pointer 27 moves forward after the bank 0 read, and holds during the bank 1 read. This, combined with an alternating bank selector, allows the mechanism described herein to pull data out of the FIFO from every other bank in order.

If the insert pointer 26 is in the "add" region 29 and the symbols in elements "I", "J", "K", and "L" are idle or configuration symbols, then the extract pointer 27 instead holds after a bank 0 read, thus replicating elements "I" and "J." In the case of an IDLE stream, this mechanism replicates an entire IDLE pair. For a CONFIG stream, this mechanism replicates the first two symbols. Accordingly, the upper layers are notified so they can ignore the extra symbols to maintain synchronization with the data stream.

If the insert pointer 26 is in the "delete" region 30 and the symbols in elements "I", "J", "K", and "L" are idle or configuration symbols, then the extract pointer clocks ahead after the bank 1 read, as well as after the bank 0 read. This has the effect of removing elements "J" and "K." In the case of the IDLE stream, this mechanism deletes the second half of one IDLE and the first half of the next IDLE, effectively merging two IDLEs into one. For a CONFIG stream, this mechanism deletes the second and third symbols of a CONFIG quartet. This leaves the data stream with the first and fourth symbols of a CONFIG word. The upper layers are notified that a delete has taken place, which is seen during the decode of the first symbol. The upper layer then ignores the fourth symbol and proceeds back to the beginning, looking for the first symbol of the next CONFIG word.

Any symbol insertion or removal may cause a running disparity error, whether during IDLE or CONFIG. Accordingly, the mechanism signals to the upper layers to ignore running disparity during FIFO modification and to recompute the running disparity based upon the revised data stream.

The result is a FIFO design which has minimal knowledge of the underlying protocol, but which maintains correct operation under all required conditions, turning data from two clock domains into a valid data stream in a third clock domain.

Figure 3:
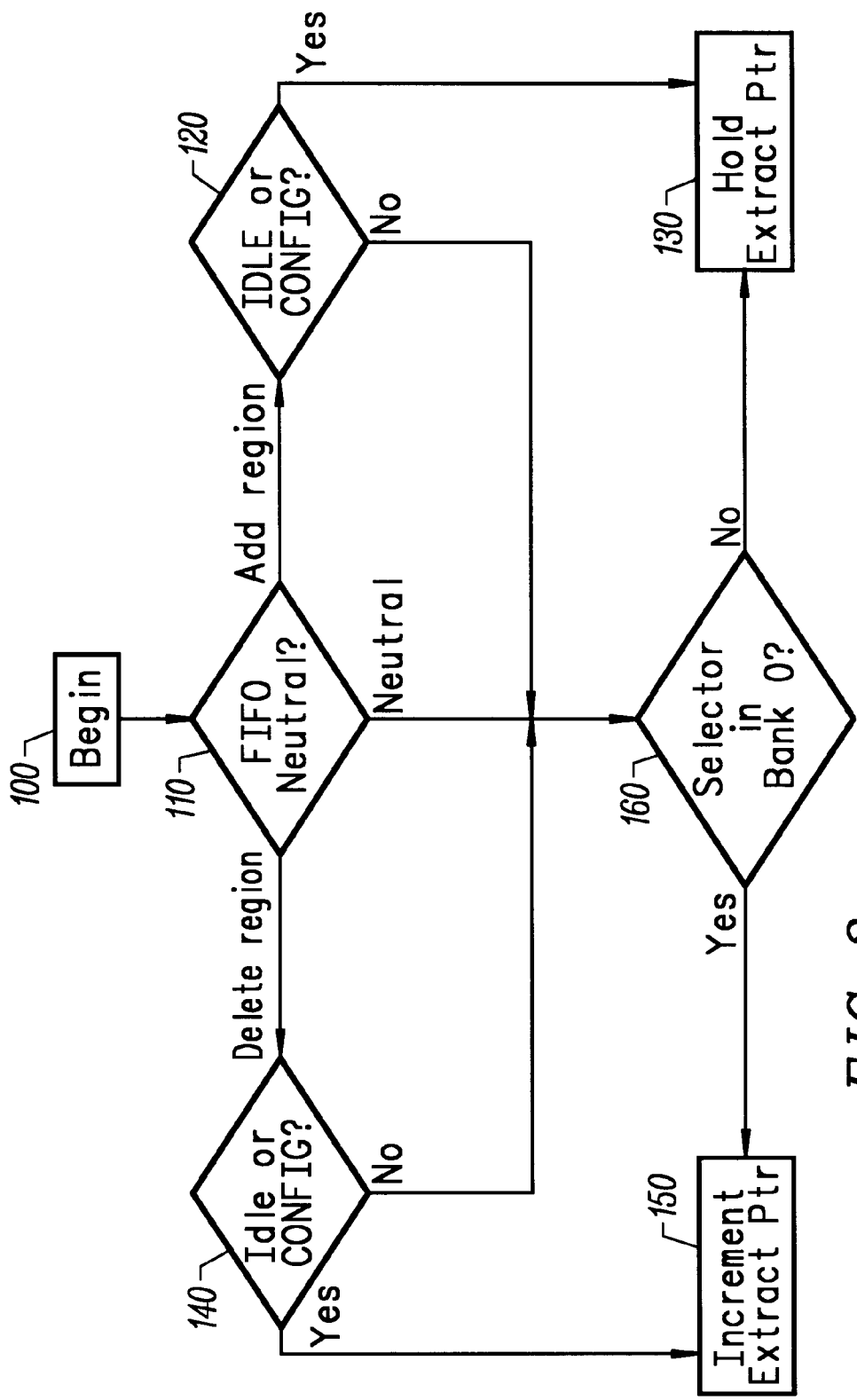
FIG. 3 is a flow diagram of the insert/extract decision on whether or not to move the extract pointer.

FIG. 3 is a flow diagram of the insert/extract decision on whether or not to move the extract pointer. When the decision process begins (100), a determination is made as to how full the FIFO currently is (110). It may be in the add region, the delete region, or the neutral region. If the FIFO remains neutral (i.e. it is not too full or too empty) a determination is made if the bank selector is in bank 0 (160). If the selector is not in bank 0 , the system holds the pointer and extracts data (130) from the FIFO; if the selector is in bank 0, the system increments the pointer and extracts data (150). If the FIFO is in the add region, then the system determines if the four elements at the head of the FIFO consist of IDLE or CONFIG (120). If either conditions are true, then a hold/extract operation is performed (130) to the FIFO; otherwise, a determination is made whether the selector is in bank 0, as discussed above. If the FIFO is in the delete region, then the system determines if the four elements at the head of the FIFO consist of IDLE or CONFIG (140). If either conditions are true, then an increment operation is performed (150) to the FIFO; otherwise, a determination is made whether the selector is in bank 0, as discussed above.

The module, shown in Table 1 below, implements an elasticity FIFO for a receive Gigabit Ethernet PCS block. The FIFO crosses the clock boundary between RBC0/RBC1 and grx_clk and is based on the synchronizer FIFO architecture disclosed by V. Cavanna, *Synchronizing System*, U.S. Pat. No. 4,873,703 (Oct. 10, 1989). The invention herein provides, in part, for moving the FIFO to a nominal state with eight octets full, so that during times when the FIFO cannot be adjusted (i.e. packet bursts), a data transfer session can survive the clock skew (up to 1.9 bytes in 9730 grx_clks). To do this, the preferred embodiment of the invention removes any of IDLEs, half of CONFIG quads, or pairs of arbitrary octets if synchronization is not yet gained. Thus, an empty indication occurs when the FIFO runs below four octets available. The module of Table 1 is a verilog expression of a hardware implementation of the invention. It will be appreciated by those skilled in the art that the invention may be implemented in either hardware or software, or a combination of hardware and software, and that the invention is not limited to the embodiment shown in the module below.

TABLE 1

Implementation of An Elasticity FIFO

```
'timescale 1ns/10ps
module pcs_rx_fifo_g (
    // Global Interface
    rx_reset_,
    // 802.3z GMII/PCS Interface
    grx_clk,
    grxd,
    grx_dv,
    grx_er,
    rbc0,
    rbc1,
    rbc0_inclk,
    rbc1_inclk,
    signal_detect,
    // PCS Interface
    rx_code_group,
    add_code_group,
    del_code_group,
    signal_valid,
    sync_status,
    an_xmit
);
// Global Interface
input   rx_reset_;   // Reset, sync'ed to grx_clk
// 803.3z GMII/PCS Interface
```

TABLE 1-continued

Implementation of An Elasticity FIFO

```
input          grx_clk;           // Receive Clock
input [7:0]    grxd;              // Receive data from phy
input          grx_dv;            // Receive data valid from phy (grxd[8])
input          grx_er;            // Receive error indication from phy (grxd[9])
Input          rbc0;              // Receive 62.5 Mhz PCS clock
input          rbc1;              // Receive 62.5 Mhz PCS clock
input          rbc0_inclk;        // Receive 62.5 Mhz PCS clock from pin
input          rbc1_inclk;        // Receive 62.5 Mhz PCS clock from pin
input          signal_detect;     // Async signal from transceiver
// PCS Interface
output [9:0]   rx_code_group;     // PCS receive code group
output         add_code_group;    // Tell RX SM we added a code group
output         del_code_group;    // Tell RX SM we deleted a code group
output         signal_valid;      // Tell PCS if we think things are kosher
input          sync_status;       // PCS is in sync with data stream
input [1:0]    an_xmit;           // PCS AutoNegotiation SM status
//====================================================
// Parameters
//====================================================
// Gray Code for Insert/Extract Pointers
// NOTE: with this code, the +N function (+8) degenerates to an inverter!
parameter
GC_0A = 4'b0000,
GC_1A = 4'b0001,
GC_2A = 4'b0011,
GC_3A = 4'b0010,
GC_4A = 4'b0110,
GC_5A = 4'b0100,
GC_6A = 4'b0101,
GC_7A = 4'b0111,
GC_0B = 4'b1111,
GC_1B = 4'b1110,
GC_2B = 4'b1100,
GC_3B = 4'b1101,
GC_4B = 4'b1001,
GC_5B = 4'b1011,
GC_6B = 4'b1010,
GC_7B = 4'b1000;
//====================================================
// Flip Flops
//====================================================
reg            rbc0_reset_s;      // First level sync of reset
reg            rbc0_reset_;       // Reset_double-synced to rbc0
reg            rbc1_reset_s;      // First level sync of reset.
reg            rbc1_reset_;       // Reset_double-synced to rbc1
reg [9:0]      in_buf_0;          // First input buffer on rbd0_inclk
reg [9:0]      in_buf_1;          // First input buffer on rbc1_inclk
reg [9:0]      rbc0_data_0;       // Fifo with input on RBC0
reg [9:0]      rbc0_data_1;       // Fifo with input on RBC0
reg [9:0]      rbc0_data_2;       // Fifo with input on RBC0
reg [9:0]      rbc0_data_3;       // Fifo with input on RBC0
reg [9:0]      rbc0_data_4;       // Fifo with input on RBC0
reg [9:0]      rbc0_data_5;       // Fifo with input on RBC0
reg [9:0]      rbc0_data_6;       // Fifo with input on RBC0
reg [9:0]      rbc0_data_7;       // Fifo with input on RBC0
reg [9:0]      rbc1_data_0;       // Fifo with input on RBC1
reg [9:0]      rbc1_data_1;       // Fifo with input on RBC1
reg [9:0]      rbc1_data_2;       // Fifo with input on RBC1
reg [9:0]      rbc1_data_3;       // Fifo with input on RBC1
reg [9:0]      rbc1_data_4;       // Fifo with input on RBC1
reg [9:0]      rbc1_data_5;       // Fifo with input on RBC1
reg [9:0]      rbc1_data_6;       // Fifo with input on RBC1
reg [9:0]      rbc1_data_7;       // Fifo with input on RBC1
reg [9:0]      rx_code_group;     // Data output from last flop
reg            signal_valid;      // Data output from last flop
reg [7:0]      rbc0_sd;           // Fifo signal_detect bit with RBC0
reg [7:0]      rbc1_sd;           // Fifo signal_detect bit with RBC1
//Bank Selector//
reg            use_bank0;         // Indication of which FIFO we output
//Insert function//
reg [3:0]      gc_insert;         // Gray Coded Insert pointer (RBC1)
reg [3:0]      gc_insert_rbc0;    // Gray Coded Insert pointer (RBC0)
reg [3:0]      gc_insert_d;       // Gray Coded Insert ptr delayed (RBC1)
```

TABLE 1-continued

Implementation of An Elasticity FIFO

```
reg [3:0]         gc_insert_s;              // GC Insert pointer first level sync
reg [3:0]         gc_insert_ss;             // GC Insert pointer (grx_clk domain)
reg [3:0]         gc_insert_sss;            // GC Insert pointer (grx_clk domain)
//Extract function//
reg [3:0]         gc_extract;               // Gray Coded Extract pointer (grx_clk)
reg [3:0]         nxt_gc_extract            // Next val of GG Extract ptr (grx_clk)
reg [3:0]         nxt_nxt_gc_extract;       // Next Next val of GC Extract ptr
reg [3:0]         gc_extract_s;             // GC Extract pointer first level sync
reg [3:0]         gc_extract_ss;            // GC Extract pointer (RBC1 domain)
reg               add_cg_d;                 // Delayed version of add_cg
reg               add_cg_dd;                // Delayed version of add_cg
reg               del_cg_d;                 // Delayed version of del_cg
reg               add_code_group;           // 2D delayed add; to send to SM
reg               del_code_group;           // 1D delayed delete, to send to SM
reg               overflow_d;               // Attempt to write to a full FIFO
// ====================================================
// Combinatorial (& local wires)
// ==================================================== reg [9:0]         pre_rx_code_group;        // Data output from FIFO
wire              pre_signal_valid;         // Signal valid output from FIFO
wire [2:0]        insert;                   // Insert pointer (RBC1 clock domain)
wire [2:0]        insert_rbc0;              // Insert pointer (RBC0 clock domain)
wire [2:0]        extract;                  // Extract pointer (grx_clk domain)
wire [2:0]        nx_extract;               // Next Extract pointer (grx_clk)
wire [2:0]        nxt_nxt_extract;          // Next Next Extract pointer (grx_clk)
wire              overflow;                 // Attempt to write to a full FIFO
wire              underflow;                // Attempt to read from an empty FIFO
reg [3:0]         nxt_gc_insert;            // Next value of GC Insert ptr (RBC1)
reg [3:0]         nxt_nxt_nxt_gc_extract;   // Next Next Next val of GC Extract ptr
reg               cg_is_K28_5;              // Current code group is K28.5
reg               n_cg_is_C1;               // Next code group is /D21.5/ of /C1/
reg               n_cg_is_C2;               // Next code group is /D2.2/ of /C2/
reg               nn_cg is_K28_5;           // Next Next code group is K28.5
// This signal indicates we are sending the K28.5 of an IDLE,
// and we have another IDLE behind it in the queue. This means
// we are in a position to be able to add/delete one if necessary.
// NOTE: Since 802.3z declares that one may receive any /D/ as the
// second octet of an IDLE, we ONLY LOOK AT THE K28.5's
wire              have_idles;
// This signal indicates we are sending the K28.5 of a Config Word,
// and the running disparity of the first data code group (DL) matches
// the disparity of the config data code group (D21.5 or D2.2). This means
// we are in a position to be able to add/delete one if necessary.
wire              have_config;
wire              can_mod;                  // Can we add/delete from FIFO now?
reg               add_cg;                   // Add a code group by pausing e-ptrs
reg               del_cg;                   // Delete a code group by double clking
// ====================================================
// Aliasing logic
// ====================================================

// The "next" code group/signal detect logic is fixed; based on the fact
// that if we are in sync, the K28.5 symbols will be on RBC1 as per SerDes.
// NOTE: These functions re-written since synopsys is brain-dead about
// register files, so we must call out each register directly.
// assign cg_is_K28_5 = ((rbc1_data[extract] == 'K28_5_M) ||
//       (rbc1_data[extract] == 'K28_5_P));
always @(rbc1_data_0 or rbc1_data_1 or rbc1_data_2 or rbc1_data_3 or
     rbc1_data_4 or rbc1_data_5 or rbc1_data_6 or rbc1_data_7 or
extract)
begin
case (extract) // synopsys infer_mux
3'h0: cg_is_K28_5 = (rbc1_data_0 == 'K28_5_M) ||
      (rbc1_data_0 == 'K28_5_P);
3'h1: cg_is_K28_5 = (rbc1_data_1 == 'K28_5_M) ||
      (rbc1_data_1 == 'K28_5_P);
3'h2: cg_is_K28_5 = (rbc1_data_2 == 'K28_5_M) ||
      (rbc1_data_2 == 'K28_5_P);
3'h3: cg_is_K28_5 = (rbc1_data_3 == 'K28_5_M) ||
      (rbc1_data_3 == 'K28_5_P);
3'h4: cg_is_K28_5 = (rbc1_data_4 == 'K28_5_M) ||
      (rbc1_data_4 == 'K28_5_P);
3'h5: cg_is_K28_5 = (rbc1_data_5 == 'K28_5_M) ||
      (rbc1_data_5 == 'K28_5_P);
```

TABLE 1-continued

Implementation of An Elasticity FIFO

```
3'h6: cg_is_K28_5 = (rbc1_data_6 == 'K28_5_M) ||
      (rbc1_data_6 == 'K28_5_P);
3'h7: cg_is_K28_5 = (rbc1_data_7 == 'K28_5_M) ||
      (rbc1_data_7 == 'K28_5_P);
    endcase
end
//assign n_cg_is_C1 = (rbc0_data[extract] == 'D21_5_P_M);
always @ (rbc0_data_0 or rbc0_data_1 or rbc0_data_2 or rbc0_data_3 or
    rbc0_data_4 or rbc0_data_5 or rbc0_data_6 or rbc0_data_7 or
extract)
begin
case (extract)     // synopsys infer_mux
3'h0: n_cg_is_C1 = (rbc0_data_0 == 'D21_5_P_M);
3'h1: n_cg_is_C1 = (rbc0_data_1 == 'D21_5_P_M);
3'h2: n_cg_is_C1 = (rbc0_data_2 == 'D21_5_P_M);
3'h3: n_cg_is_C1 = (rbc0_data_3 == 'D21_5_P_M);
3'h4: n_cg_is_C1 = (rbc0_data_4 == 'D21_5_P_M);
3'h5: n_cg_is_C1 = (rbc0_data_5 == 'D21_5_P_M);
3'h6: n_cg_is_C1 = (rbc0_data_6 == 'D21_5_P_M);
3'h7: n_cg_is_C1 = (rbc0_data_7 == 'D21_5_P_M);
    endcase
end
//assign n_cg_is_C2 = ((rbc0 data[extract] == 'D2_2_M) ||
//      (rbc0_data[extract] == 'D2_2_P));
always @(rbc0_data_0 or rbc0_data_1 or rbc0_data_2 or rbc0_data_3 or
    rbc0_data_4 or rbc0_data_5 or rbc0_data_6 or rbc0_data_7 or
extract)
begin
case (extract)     // synopsys infer_mux
3'h0: n_cg_is_C2 = (rbc0_data_0 == 'D2_2_M) ||
      (rbc0_data_0 == 'D2_2_P);
3'h1: n_cg_is_C2 = (rbc0_data_1 == 'D2_2_M) ||
      (rbc0_data_1 == 'D2_2_P);
3'h2: n_cg_is_C2 = (rbc0_data_2 == 'D2_2_M) ||
      (rbc0_data_2 = = 'D2_2_P);
3'h3: n_cg_is_C2 = (rbc0_data_3 == 'D2_2_M) ||
      (rbc0_data_3 == 'D2_2_P);
3'h4: n_cg_is_C2 = (rbc0_data_4 == 'D2_2_M) ||
      (rbc0_data_4 == 'D2_2_P);
3'h5: n_cg_is_C2 = (rbc0_data_5 == 'D2_2_M) ||
      (rbc0_data_5 == 'D2_2_P);
3'h6: n_cg_is_C2 = (rbc0_data_6 == 'D2_2_M) ||
      (rbc0_data_6 == 'D2_2_P);
3'h7: n_cg_is_C2 = (rbc0_data_7 == 'D2_2_M) ||
      (rbc0_data_7 == 'D2_2_P);
    endcase
end
//assign nn_cg_is_K28_5 = ((rbc1_data[nxt_extract] == 'K28_5_M) ||
//      (rbc1_data[nxt_extract] == 'K28_5_P));
always @(rbc1_data_0 or rbc1_data_1 or rbc1_data_2 or rbc1_data_3 or
    rbc1_data_4 or rbc1_data_5 or rbc1_data_6 or rbc1_data_7 or
nxt_extract)
begin
case (nxt_extract) // synopsys infer_mux
3'h0: nn_cg_is_K28_5 = (rbc1_data_0 == 'K28_5_M) ||
      (rbc1_data_0 == 'K28_5_P);
3'h1: nn_cg_is_K28_5 = (rbc1_data_1 == 'K28_5_M) ||
      (rbc1 data_1 = = 'K28_5_P);
3'h2: nn_cg_is_K28_5 = (rbc1_data_2 == 'K28_5_M) ||
      (rbc1_data_2 == 'K28_5_P);
3'h3: nn_cg_is_K28_5 = (rbc1_data_3 == 'K28_5_M) ||
      (rbc1_data_3 == 'K28_5_P);
3'h4: nn_cg_is_K28_5 = (rbc1_data_4 == 'K28_5_M) ||
      (rbc1_data_4 == 'K28_5_P);
3'h5: nn_cg_is_K28_5 = (rbc1_data_5 == 'K28_5_M) ||
      (rbc1_data_5 == 'K28_5_P);
3'h6: nn_cg_is_K28_5 = (rbc1_data_6 == 'K28_5_M) ||
      (rbc1_data_6 == 'K28_5_P);
3'h7: nn_cg_is_K28_5 = (rbc1_data_7 == 'K28_5_M) ||
      (rbc1 data_7 = = 'K28_5_P);
endcase
end
assign have_idles = ~use_bank0 & cg_is_K28_5 & nn_cg_is_K28_5
assign have_config = ~use_bank0 & cg_is_K28_5 & (n_cg_is_C1 |
n_cg_is_C2);
// There are times we are not allowed to add/delete from the FIFO:
// If we are in the middle of a valid packet burst, or in config
```

TABLE 1-continued

Implementation of An Elasticity FIFO

```
// when the FIFO is not correctly lined up on a Config Reg
// Note: the first lines below are for when we're not yet in good stuff
assign can_mod = (_use_bank0 &&
      ((sync_status != 'OK) ||
      ~signal_valid ||
      ~rbc1_sd[extract] ||
      ~rbc0_sd[extract] ||
      ~rbc1_sd[nxt_extract] ||
      ~rbc0_sd[nxt_extract] ||
      ((an_xmit == 'AN_DATA) && have_idles) ||
      ((an_xmit == 'AN_IDLE) && have_idles) ||
      ((an_xmit == 'AN_IDLE) && have_config) ||
      ((an_xmit == 'AN_CONFIG) && have_idles) ||
      ((an_xmit == 'AN_CONFIG) && have_config)));
// Alias Gray Coded pointers to real ones
assign insert[2] = gc_insert[3] ^ gc_insert[2];
assign insert[1] = gc_insert[3] ^ gc_insert[1];
assign insert[0] = gc_insert[3] ^ gc_insert[0];
assign insert_rbc0[2] = gc_insert_rbc0[3] ^ gc_insert_rbc0[2];
assign insert_rbc0[1] = gc_insert_rbc0[3] ^ gc_insert_rbc0[1];
assign insert_rbc0[0] = gc_insert_rbc0[3] ^ gc_insert_rbc0[0];
assign extract[2] = gc_extract[3] ^ gc_extract[2];
assign extract[1] = gc_extract[3] ^ gc_extract[1];
assign extract[0] = gc_extract[3] ^ gc_extract[0];
assign nxt_extract[2] = nxt_gc_extract[3] ^ nxt_gc_extract[2];
assign nxt_extract[1] = nxt_gc_extract[3] ^ nxt_gc_extrac[1];
assign nxt_extract[0] = nxt_gc_extract[3] ^ nxt_gc_extract[0];
assign nxt_nxt_extract[2] = nxt_nxt_gc_extract[3] ^ nxt_nxt_gc_extract[2];
assign nxt_nxt_extract[1] = nxt_nxt_gc_extract[3] ^ nxt_nxt_gc_extract[1];
assign nxt_nxt_extract[0] = nxt_nxt_gc_extract[3] ^ nxt_nxt_gc_extract[0];
// Account for need to look at 4 octets ahead of byte output
// NOTE: overflow is calculated using a one-clock delayed version of
// the insert pointer, to account for the delay the 2 synchronizers add
// to the extract pointer. Since we know that the grx clock never stalls,
// and in fact speeds up (doubles) when near the full point, there is no
// risk of missing the overflow condition.
assign overflow = (gc_extract_ss == gc_insert_d);
assign underflow = (gc_insert_sss == nxt_gc_extract);
//===================================================
// Debugging Aids
//===================================================
// synopsys translate_off
wire [2:0] insert_sss, extract_ss; // short versions of synchronized ptrs
reg [2:0]      i, i_sss, e, e_ss, ne, nne; // readable insert/extract numbers
reg [2:0]      depth_grx;          // how full is the fifo from grx domain
reg [2:0]      depth_rbc;          // how full is the fifo from rbc domain
reg [2:0]      depth_true;         // how full the fifo really is
assign insert_sss[2] = gc_insert sss[3] ^ gc_insert_sss[2];
assign insert_sss[1] = gc_insert sss[3] ^ gc_insert_sss[1];
assign insert_sss[0] = gc_insert sss[3] ^ gc_insert_sss[0];
assign extract_ss[2] = gc_extract ss[3] ^ gc_extract_ss[2];
assign extract_ss[1] = gc_extract ss[3] ^ gc_extract_ss[1];
assign extract_ss[0] = gc_extract ss[3] ^ gc_extract_ss[0];
always @ (insert)
begin
case (insert)
3'h0: i = 0;
3'h1: i = 1;
3'h3: i = 2;
3'h2: i = 3;
3'h6: i = 4;
3'h4: i = 5;
3'h5: i = 6;
3'h7: i = 7;
endcase
end
always @(insert_sss)
begin
case (insert_sss)
3'h0: i_sss = 0;
3'h1: i_sss = 1;
3'h3: i_sss = 2;
3'h2: i_sss = 3;
3'h6: i_sss = 4;
```

TABLE 1-continued

Implementation of An Elasticity FIFO

```
3'h4: i_sss = 5;
3'h5: i_sss = 6;
3'h7: i_sss = 7;
endcase
end
always @(extract)
begin
case (extract)
3'h0: e = 0;
3'h1: e = 1;
3'h3: e = 2;
3'h2: e = 3;
3'h6: e = 4;
3'h4: e = 5;
3'h5: e = 6;
3'h7: e = 7;
endcase
end
always @(extract_ss)
begin
case (extract_ss)
3'h0: e_ss_0
3'h1: e_ss_1;
3'h3: e_ss_2;
3'h2: e_ss_3;
3'h6: e_ss_4;
3'h4: e_ss_5;
3'h5: e_ss_6;
3'h7: e_ss_7;
endcase
end
always @(nxt_extract)
begin
case (nxt_extract)
3'h0: ne = 0;
3'h1: ne = 1;
3'h3: ne = 2;
3'h2: ne = 3;
3'h6: ne = 4;
3'h4: ne = 5;
3'h5: ne = 6;
3'h7: ne = 7;
endcase
end
always @(nxt_nxt_extract)
begin
case (nxt_nxt_extract)
3'h0: nne = 0;
3'h1: nne = 1;
3'h3: nne = 2;
3'h2: nne = 3;
3'h6: nne = 4;
3'h4: nne = 5;
3'h5: nne = 6;
3'h7: nne = 7;
endcase
end
always @(i_sss or e) depth_grx = i_sss - e;
always @(i or e_ss) depth_rbc = i - e_ss;
always @(i or e) depth_true = i - e;
// synopsys translate_on
//==================================================
//Logic
//==================================================
// Create double-synced resets
always @(posedge rbc0)
begin
rbc0_reset_s <= rx_reset_;
rbc0_reset_ <= rbc0_reset_s;
end
always @(posedge rbc1)
begin
rbc1_reset_s <= rx_reset_;
rbc1_reset_ <= rbc1_reset_s;
end
```

TABLE 1-continued

Implementation of An Elasticity FIFO

```
// Register data coming in with RBC0/1
// NOTE: For synthesis, we use_two clock pairs:
// rbc0/rbc1 and rbc0__inclk/rbc1__inclk
// The *__inclk pair is only used for the initial input register.
// All other logic, including the register file, is driven off rbc0/rbc1
// ALSO NOTE: We bit-swap the lines at this point, since the rest of the
// PCS layer runs off of busses defined as [9:0], not [0:9]!!!
always @(posedge rbc0__inclk) in__buf__0 <=
{grxd[0], grxd[1], grxd[2], grxd[3],
grxd[4], grxd[5], grxd[6], grxd[7], grx__dv, grx__er};
always @(posedge rbc1__inclk) in__buf__1 <=
{grxd[0], grxd[1], grxd[2], grxd[3],
grxd[4], grxd[5], grxd[6], grxd[7], grx__dv, grx__er};
always @ (posedge rbc0)
begin
if (!rbc0__reset__)
begin
rbc0__sd[7:0] <= 8'b0; // Entire FIFO is invalid to start
gc__insert__rbc0 <= GC__4A; // Reset to nominal location
rbc0__data__0 <= 10'h0;
rbc0__data__1 <= 10'h0;
rbc0__data__2 <= 10'h0;
rbc0__data__3 <= 10'h0;
rbc0__data__4 <= 10'h0;
rbc0__data__5 <= 10'h0;
rbc0__data__6 <= 10'h0;
rbc0__data__7 <= 10'h0;
end
else
begin
case (insert__rbc0)
3'h0: rbc0__data__0 <= in__buf__0;
3'h1: rbc0__data__1 <= in__buf__0;
3'h2: rbc0__data__2 <= in__buf__0;
3'h3: rbc0__data__3 <= in__buf__0;
3'h4: rbc0__data__4 <= in__buf__0;
3'h5: rbc0__data__5 <= in__buf__0;
3'h6: rbc0__data__6 <= in__buf__0;
3'h7: rbc0__data__7 <= in__buf__0;
endcase
rbc0__sd[insert] <= signal__detect && (overflow || overflow__d);
gc__insert__rbc0 <= gc__insert; // Insert pointer in RBC0 domain
  end
end
always @(posedge rbc1)
begin
if (!rbc1__reset__)
begin
rbc1__sd[7:0] <= 8'b0;                    // Entire FIFO is invalid to start
gc__insert <= GC__4A;                     // Reset to nominal location
gc__insert__d <= GC__3A;                  // Reset to nominal location
overflow__d <= 1'b0;                      // Nominally not overflowing
rbc1__data__0 <= 10'h0;
rbc1__data__1 <= 10'h0;
rbc1__data__2 <= 10'h0;
rbc1__data__3 <= 10'h0;
rbc1__data__4 <= 10'h0;
rbc1__data__5 <= 10'h0;
rbc1__data__6 <= 10'h0;
rbc1__data__7 <= 10'h0;
end
else
begin
case (insert)
3'h0: rbc1__data__0 <= in__buf__1;
3'h1: rbc1__data__1 <= in__buf__1;
3'h2: rbc1__data__2 <= in__buf__1;
3'h3: rbc1__data__3 <= in__buf__1;
3'h4: rbc1__data__4 <= in__buf__1;
3'h5: rbc1__data__5 <= in__buf__1;
3'h6: rbc1__data__6 <= in__buf__1;
3'h7: rbc1__data__7 <= in__buf__1;
endcase
rbc1__sd[insert] <= signal__detect && ~(overflow || overflow__d);
overflow__d    <= overflow;          // Delayed version so SD low afterwards
gc__insert__d  <= gc__insert;        // Delayed version for overflow calc
gc__insert     <= nxt__gc__insert;   // Insert pointer ALWAYS moves
```

TABLE 1-continued

Implementation of An Elasticity FIFO

```
    end
end
// Synchronize pointers to other side
always @(posedge rbc1)
begin
gc_extract_s <= ~gc_extract // NOTE: This includes +8 inverter
gc_extract_ss <= gc_extract_s;
end
always @(posedge grx_clk)
begin
gc_insert_s <= gc_insert;
gc_insert_ss <= gc_insert_s;
gc_insert_sss <= gc_insert_ss;
end
always @(posedge grx_clk)
begin
if (!rx_reset_)
begin
gc_extract <= GC_0A;
nxt_gc_extract <= GC_1A;
nxt_nxt_gc_extract <= GC_2A;
rx_code_group <= 10'b0;
signal_valid <= 1'b0;
use_bank0 <= 1'b0;
add_cg_d <= 1'b0;
add_cg_dd <= 1'b0;
add_code_group <= 1'b0;
del_cg_d <= 1'b0;
del_code_group <= 1'b0;
end
else
begin
// Decision to step forward or hold current position:
// Nominal: Step forward when in bank0, not when in bank 1
// Add: Don't step forward when in bank0, causes add 2 octets
// Delete: Step forward in either bank; bank 1 step causes del 2 octets
if (add_cg_d | (~use_bank0 & del_cg)) // Hold our current position
begin
gc_extract <= gc_extract;
nxt_gc_extract <= nxt_gc_extract;
nxt_nxt_gc_extract <= nxt_nxt_gc_extract;
end
else                                   // Step forward one element
begin
gc_extract <= nxt_gc_extract;
nxt_gc_extract <= nxt_nxt_gc_extract;
nxt_nxt_gc_extract <= nxt_nxt_nxt_gc_extract;
end
rx_code_group    <= pre_rx_code_group;
signal_valid     <= pre_signal_valid;
use_bank0        <= ~use_bank0;
add_cg_d         <= add_cg;
add_cg_dd        <= add_cg_d;
add_code_group   <= add_cg_dd;         // this sig goes to RX SM
del_cg_d         <= del_cg;
del_code_group   <= del_cg_d;          // this sig goes to RX SM
    end
end
// Compute Next Pointers
always @(gc_insert or overflow)
begin
if (overflow) nxt_gc_insert_= gc_insert; // Never move beyond full!!!
else
begin
case (gc_insert) //synopsys full_case parallel_case
GC_0A: nxt_gc_insert = GC_1A;
GC_1A: nxt_gc_insert = GC_2A;
GC_2A: nxt_gc_insert = GC_3A;
GC_3A: nxt_gc_insert = GC_4A;
GC_4A: nxt_gc_insert = GC_5A;
GC_5A: nxt_gc_insert = GC_6A;
GC_6A: nxt_gc_insert = GC_7A;
GC_7A: nxt_gc_insert = GC_0B;
GC_0B: nxt_gc_insert = GC_1B;
GC_1B: nxt_gc_insert = GC_2B;
GC_2B: nxt_gc_insert = GC_3B;
GC_3B: nxt_gc_insert = GC_4B;
```

TABLE 1-continued

Implementation of An Elasticity FIFO

```
GC_4B: nxt_gc_insert = GC_5B;
GC_5B: nxt_gc_insert = GC_6B;
GC_6B: nxt_gc_insert = GC_7B;
GC_7B: nxt_gc_insert = GC_0A;
    endcase
  end
end
// This is the tough one. We must decide if we would like to add/delete
// from the FIFO, and if we are allowed to, and then make the change
// seamlessly to the upper layers. We can't make it entirely seamless,
// so we send signals up to the RX SM to account for the discrepancy.
// We attempt to keep the FIFO with 8-9 octets in it. If we ever get
// to between 4-7 octets, we Iook for an opportunity to add. If we ever
// get to between 10-16 octets, we Iook for an opportunity to delete.
always @(nxt_nxt_gc_extract or gc_insert_sss or underflow or
can_mod or have_config or have_idles)
begin
if (underflow) // Never go past the virtual empty point (4 bytes)
nxt_nxt_nxt_gc_extract = nxt_nxt_gc_extract;
else
begin
case (nxt_nxt_gc_extract) // synopsys full_case parallel_case
// Default to increment pointer unless told not to
GC_0A: nxt_nxt_nxt_gc_extract = GC_1A;
GC_1A: nxt_nxt_nxt_gc_extract = GC_2A;
GC_2A: nxt_nxt_nxt_gc_extract = GC_3A;
GC_3A: nxt_nxt_nxt_gc_extract = GC_4A;
GC_4A: nxt_nxt_nxt_gc_extract = GC_5A;
GC_5A: nxt_nxt_nxt_gc_extract = GC_6A;
GC_6A: nxt_nxt_nxt_gc_extract = GC_7A;
GC_7A: nxt_nxt_nxt_gc_extract = GC_0B;
GC_0B: nxt_nxt_nxt_gc_extract = GC_1B;
GC_1B: nxt_nxt_nxt_gc_extract = GC_2B;
GC_2B: nxt_nxt_nxt_gc_extract = GC_3B;
GC_3B: nxt_nxt_nxt_gc_extract = GC_4B;
GC_4B: nxt_nxt_nxt_gc_extract = GC_5B;
GC_5B: nxt_nxt_nxt_gc_extract = GC_6B;
GC_6B: nxt_nxt_nxt_gc_extract = GC_7B;
GC_7B: nxt_nxt_nxt_gc_extract = GC_0A;
endcase
end
add_cg = 0;      // Default to not adding unless told to do so
del_cg = 0;      // Default to not delete unless told to do so
case (nxt_nxt_gc_extract)
GC_0A:
// Key to FIFO comments:
// UA == Underflow:Add, EA == Empty:Add, A == Add, N == Nominal
// D == Delete, DF == Full:Delete, X = Should never happen
case (gc_insert_sss)
// 0A 1A 2A 3A 4A 5A 6A 7A 0B 1B 2B 3B 4B 5B 6B 7B
// EA A N D D D DF X X X X X X X X UA
GC_7B, GC_0A, GC_1A: add_cg = can_mod;
GC_3A, GC_4A, GC_5A, GC_6A: del_cg = can_mod;
// synopsys translate_off
GC_2A:; // Nominal case
default: if (rx_reset_ && ~dot3z_gmii_mode)
$display("%0t: ERROR - PCS rx fifo in bad state(%m)!",
$time, "i_sss=%0d, nne=%0d", i_sss, nne);
// synopsys translate_on
endcase
GC_1A:
case (gc_insert_sss)
// 0A 1A 2A 3A 4A 5A 6A 7A 0B 1B 2B 3B 4B 5B 6B 7B
// UA EA A N D D D DF X X X X X X X X
GC_0A, GC_1A, GC_2A: add_cg = can_mod;
GC_4A, GC_5A, GC_6A, GC_7A: del_cg = can_mod;
// synopsys translate_off
GC_3A:; // Nominal case
default: if (rx_reset_ && ~dot3z_gmii_mode)
$display("%0t: ERROR - PCS rx fifo in bad state(%m)!",
$time, "i_sss=%0d, nne=%0d", i_sss, nne);
// synopsys translate_on
endcase
GC_2A:
case (gc_insert_sss)
// 0A 1A 2A 3A 4A 5A 6A 7A 0B 1B 2B 3B 4B 5B 6B 7B
// X UA EA A N D D D DF X X X X X X X
```

TABLE 1-continued

Implementation of An Elasticity FIFO

```
GC_1A, GC_2A, GC_3A: add_cg = can_mod;
GC_5A; GC_6A, GC_7A, GC_0B : del_cg = can_mod;
// synopsys translate_off
GC_4A:; // Nominal case
default: if (rx_reset_&& ~dot3z.gmii_mode)
$display("%0t: ERROR - PCS rx fifo in bad state(%m)!",
$time, "i_sss=%0d, nne=%0d", i_sss, nne);
// synopsys translate_on
endcase
GC_3A:
case (gc_insert_sss)
// 0A 1A 2A 3A 4A 5A 6A 7A 0B 1B 2B 3B 4B 5B 6B 7B
// X  X  UA EA A  N  D  D  D  DF X  X  X  X  X  X
GC_2A, GC_3A, GC_4A: add_cg = can_mod;
GC_6A, GC_7A, GC_0B, GC_1B: del_cg = can_mod;
// synopsys translate_off
GC_5A:; // Nominal case
default: if (rx_reset_&& ~dot3z.gmii_mode)
$display("%0t: ERROR - PCS rx fifo in bad state(%m)!",
$time "i_sss=%0d, nne=%0d", i_sss, nne);
// synopsys translate_on
endcase
GC_4A:
case (gc_insert_sss)
// 0A 1A 2A 3A 4A 5A 6A 7A 0B 1B 2B 3B 4B 5B 6B 7B
// X  X  X  UA EA A  N  D  D  D  DF X  X  X  X  X
GC_3A, GC_4A, GC_5A: add_cg = can_mod;
GC_7A, GC_0B, GC_1B, GC_2B : del_cg = can_mod;
// synopsys translate_off
GC_6A:; // Nominal case
default: if (rx_reset_&& ~dot3z.gmii_mode)
$display("%0t: ERROR - PCS rx fifo in bad state(%m)!",
$time, "i_sss=%0d, nne=%0d", i_sss, nne);
// synopsys translate_on
endcase
GC_5A:
case (gc_insert_sss)
// 0A 1A 2A 3A 4A 5A 6A 7A 0B 1B 2B 3B 4B 5B 6B 7B
// X  X  X  X  UA EA A  N  D  D  D  DF X  X  X  X
GC_4A, GC_5A, GC_6A: add_cg = can_mod;
GC_0B, GC_1B, GC_2B, GC_3B: del_cg = can_mod;
// synopsys translate_off
GC_7A:; // Nominal case
default: if (rx_reset_&& ~dot3z.gmii_mode)
$display("%0t: ERROR - PCS rx fifo in bad state(%m)!",
$time, "i_sss=%0d, nne=%0d", i_sss, nne);
// synopsys translate_on
endcase
GC_6A:
case(gc_insert_sss)
// 0A 1A 2A 3A 4A 5A 6A 7A 0B 1B 2B 3B 4B 5B 6B 7B
// X  X  X  X  X  UA EA A  N  D  D  D  DF X  X  X
GC_5A, GC_6A, GC_7A: add_cg = can_mod;
GC_1B, GC_2B, GC_3B, GC_4B : del_cg = can_mod;
// synopsys translate_off
GC_0B:; // Nominal case
default: if (rx_reset_&& ~dot3z.gmii_mode)
$display("%0t: ERROR - PCS rx fifo in bad state(%m)!",
$time, "i_sss=%0d, nne=%0d", i_sss, nne);
// synopsys translate_on
endcase
GC_7A:
case (gc_insert_sss)
// 0A 1A 2A 3A 4A 5A 6A 7A 0B 1B 2B 3B 4B 5B 6B 7B
// X  X  X  X  X  X  UA EA A  N  D  D  D  DF X  X
GC_6A, GC_7A, GC_0B: add_cg = can_mod;
GC_2B, GC_3B, GC_4B, GC_5B: del_cg = can_mod;
// synopsys translate_off
GC_1B:; // Nominal case
default: if (rx_reset_&& ~dot3z.gmii_mode)
$display("%0t: ERROR - PCS rx fifo in bad state(%m)!",
$time, "i_sss = %0d, nne = %0d", i_sss, nne);
// synopsys translate_on
endcase
GC_0B:
case (gc_insert_sss)
// 0A 1A 2A 3A 4A 5A 6A 7A 0B 1B 2B 3B 4B 5B 6B 7B
```

TABLE 1-continued

Implementation of An Elasticity FIFO

```
// X X X X X X X UA EA A N D D D DF X
GC_7A, GC_0B, GC_1B: add_cg = can_mod;
GC_3B, GC_4B, GC_5B, GC_6B: del_cg = can_mod;
// synopsys translate_off
GC_2B:; // Nominal case
default: if (rx_reset_&& ~dot3z.gmii_mode)
$display("%0t: ERROR - PCS rx fifo in bad state(%m)!",
$time, "i_sss=%0d, nne=%0d", i_sss, nne);
// synopsys translate_on
endcase
GC_1B:
case (gc_insert_sss)
// 0A 1A 2A 3A 4A 5A 6A 7A 0B 1B 2B 3B 4B 5B 6B 7B
// X X X X X X X X UA EA A N D D D DF
GC_0B, GC_1B; GC_2B: add_cg = can_mod;
GC_4B, GC_5B, GC_6B, GC_7B: del_cg = can_mod;
// synopsys translate_off
GC_3B:; // Nominal case
default: if (rx_reset_&& ~dot3z.gmii_mode)
$display("%0t: ERROR - PCS rx fifo in bad state(%m)!",
$time, "i_sss=%0d, nne=%0d", i_sss, nne);
// synopsys translate_on
endcase
GC_2B:
case (gc_insert_sss)
// 0A 1A 2A 3A 4A 5A 6A 7A 0B 1B 2B 3B 4B 5B 6B 7B
// DF X X X X X X X X UA EA A N D D D
GC_1 B GC_2B, GC_3B: add_cg = can_mod;
GC_5B, GC_6B, GC_7B, GC_0A: del_cg = can_mod;
// synopsys translate_off
GC_4B:; // Nominal case
default: if (rx_reset_&& ~dot3z.gmii_mode)
$display("%0t: ERROR - PCS rx fifo in bad state(%m)!",
$time, "i_sss=%0d, nne=%0d", i_sss, nne);
// synopsys translate_on
endcase
GC_3B:
case (gc_insert_sss)
// 0A 1A 2A 3A 4A 5A 6A 7A 0B 1B 2B 3B 4B 5B 6B 7B
// D DF X X X X X X X X UA EA A N D D
GC_2B GC_3B, GC_4B: add_cg = can_mod;
GC_6B, GC_7B, GC_0A, GC_1A: del_cg = can_mod;
// synopsys translate_off
GC_5B:; // Nominal case
default: if (rx_reset_&& ~dot3z.gmii_mode)
$display("%0t: ERROR - PCS rx fifo in bad state(%m)!",
$time "i_sss=%0d, nne=%0d", i_sss, nne);
// synopsys translate_on
endcase
GC_4B:
case (gc_insert_sss)
// 0A 1A 2A 3A 4A 5A 6A 7A 0B 1B 2B 3B 4B 5B 6B 7B
// D D DF X X X X X X X X UA EA A N D
GC_3B, GC_4B, GC_5B: add_cg = can_mod;
GC_7B, GC_0A, GC_1A, GC_2A: del_cg = can_mod;
// synopsys translate_off
GC_6B:; // Nominal case
default: if (rx_reset_&& ~dot3z.gmii_mode)
$display("%0t ERROR - PCS rx fifo in bad state(%m)!",
$time "i_sss=%0d, nne=%0d", i_sss, nne);
// synopsys translate_on
endcase
GC_5B:
case (gc_insert_sss)
// 0A 1A 2A 3A 4A 5A 6A 7A 0B 1B 2B 3B 4B 5B 6B 7B
// D D D DF X X X X X X X X UA EA A N
GC_4B, GC_5B, GC_6B: add_cg = can_mod;
GC_0A GC_1A, GC_2A GC_3A: del_cg = _can_mod;
// synopsys translate_off
GC_7B:; // Nominal case
default: if (rx_reset_&& ~dot3z.gmii_mode)
$display("%0t: ERROR - PCS rx fifo in bad state(%m)!",
$time, "i_sss=%0d, nne=%0d", i_sss, nne);
// synopsys transiate_on
endcase
GC_6B:
case (gc_insert_sss)
```

TABLE 1-continued

Implementation of An Elasticity FIFO

```
// 0A 1A 2A 3A 4A 5A 6A 7A 0B 1B 2B 3B 4B 5B 6B 7B
// N D D D DF X X X X X X X X UA EA A
GC_5B, GC_6B, GC_7B: add_cg = can_mod;
GC_1A, GC_2A, GC_3A, GC_4A: del_cg = can_mod;
// synopsys translate_off
GC_0A:; // Nominal case
default: if (rx_reset_&& ~dot3z.gmii_mode)
$display("%0t: ERROR - PCS rx fifo in bad state(%m)!",
$time, "i_sss = %0d, nne = %0d", i_sss, nne);
// synopsys translate_on
endcase
GC_7B:
case (gc_insert_sss)
// 0A 1A 2A 3A 4A 5A 6A 7A 0B 1B 2B 3B 4B 5B 6B 7B
// A N D D D DF X X X X X X X X UA EA
GC_6B, GC_7B, GC_0A: add_cg = can_mod;
GC_2A, GC_3A, GC_4A, GC_5A: del_cg = can_mod;
// synopsys translate_off
GC_1A:; // Nominal case
default: if (rx_reset_&& ~dot3z.gmii_mode)
$display("%0t: ERROR - PCS rx fifo in bad state(%m)!",
$time, "i_sss=%0d, nne=%0d", i_sss, nne);
// synopsys translate_on
endcase
endcase // nxt_nxt_gc_extract
end // always
// Synopsys doesn't generate efficient muxes unless you tell it
//assign rx_code_group = (use_bank0) ? rbc0_data[extract]:
rbc1_data[extract];
always @(use_bank0 or extract or
rbc0_data_0 or
rbc0_data_1 or
rbc0_data_2 or
rbc0_data_3 or
rbc0_data_4 or
rbc0_data_5 or
rbc0_data_6 or
rbc0_data_7 or
rbc1_data_0 or
rbc1_data_1 or
rbc1_data_2 or
rbc1_data_3 or
rbc1_data_4 or
rbc1_data_5 or
rbc1_data_6 or
rbc1_data_7)
begin
case ({use_bank0, extract}) // synopsys infer_mux
4'b1_000: pre_rx_code_group = rbc0_data_0;
4'b1_001: pre_rx_code_group = rbc0_data_1;
4'b1_010: pre_rx_code_group = rbc0_data_2;
4'b1_011: pre_rx_code_group = rbc0_data_3;
4'b1_100: pre_rx_code_group = rbc0_data_4;
4'b1_101: pre_rx_code_group = rbc0_data_5;
4'b1_110: pre_rx_code_group = rbc0_data_6;
4'b1_111: pre_rx_code_group = rbc0_data_7;
4'b0_000: pre_rx_code_group = rbc1_data_0;
4'b0_001: pre_rx_code_group = rbc1_data_1;
4'b0_010: pre_rx_code_group = rbc1_data_2;
4'b0_011: pre_rx_code_group = rbc1_data_3;
4'b0_100: pre_rx_code_group = rbc1_data_4;
4'b0_101: pre_rx_code_group = rbc1_data_5;
4'b0_110: pre_rx_code_group = rbc1_data_6;
4'b0_111: pre_rx_code_group = rbc1_data_7;
endcase
end
assign pre_signal_valid = ((use_bank0) ? rbc0_sd[extract]:
        rbc1_sd[extract]) &&
        !underflow;
```

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. In a synchronizing system consisting of a synchronizer having a receiving side coupled to a first system and a transmitting side coupled to a second system, a mechanism within said synchronizer comprising:

a synchronizing FIFO for merging symbols from two separate input clock domains, 180 degrees out of phase with one another, into a single output clock domain; and means for selectively adding or removing elements from said synchronizing FIFO to maintain a valid data stream.

2. The mechanism of claim 1, wherein said data stream is a Gigabit Ethernet (IEEE 802.3 clause 36, 1000BASE-X) data stream.

3. The mechanism of claim 1, further comprising:

means for determining when it is acceptable to add or remove symbols from said data stream.

4. The mechanism of claim 3, further comprising:

means wherein, during configuration, symbols may be added or removed, but only in quartets, unless an upper layer is made aware of said add/remove operation, which only adds/removes in pairs.

5. The mechanism of claim 3, further comprising:

means wherein, during idle, symbols may be added or removed, but only in pairs.

6. The mechanism of claim 3, further comprising:

means for signaling a disparity check circuitry so that symbol removal does not cause detection of a disparity error.

7. The mechanism of claim 3, said synchronizing FIFO further comprising:

an insert pointer into said FIFO, wherein each input clock writes data symbols into a specific, corresponding location of said FIFO; and an extract pointer.

8. The mechanism of claim 1, said synchronizing FIFO comprising:

at least two banks.

9. The mechanism of claim 8, further comprising:

an output clock for alternately reading data symbols from said at least two synchronizing FIFO banks by muxing the output of said two synchronizing FIFO banks with a bank selector which toggles during every output clock cycle.

10. The mechanism of claim 8, further comprising:

means for monitoring a predetermined number of next symbols in said synchronizing FIFO in an output clock domain to determine if said mechanism is at a point where it is safe to perform an add/remove operation.

11. The mechanism of claim 8, wherein a signal is sent up to an upper level state machine indicating that a shortened configuration (CONFIG) word may have been created due to an add/remove operation.

12. The mechanism of claim 10, wherein it is permissible to modify said synchronizing FIFO if said next symbols map to IDLE or CONFIG sequences.

13. The mechanism of claim 8, wherein said synchronizing FIFO is in a neutral position when it is filled to a predetermined portion of its capacity such that no additions or removals are necessary; wherein said synchronizing FIFO is in an add region when it is filled to less than said predetermined portion of it's capacity; and wherein said synchronizing FIFO is in a remove region when it is filled to more than said predetermined portion of it's capacity.

14. In a synchronizing system consisting of a synchronizer having a receiving side coupled to a first system and a transmitting side coupled to a second system, a mechanism within said synchronizer comprising:

a synchronizing FIFO for receiving symbols from a single clock domain, said synchronizing FIFO comprising a single bank; and means for selectively adding or removing elements from said synchronizing FIFO upon the occurrence of predetermined conditions to maintain a valid data stream, wherein said means for selectively adding or removing elements, upon detection of an idle or configuration condition in the front bytes of said FIFO, skips at least one next byte for a delete and repeats the at least one next byte for an insert.

* * * * *